United States Patent [19]

Bergamo

[11] Patent Number: 4,762,357
[45] Date of Patent: Aug. 9, 1988

[54] LINEAR ACTION GRIPPER FOR A ROBOT

[75] Inventor: Samuel Bergamo, Metamora, Mich.

[73] Assignee: General Motors Corporation, Detroit, Mich.

[21] Appl. No.: 84,183

[22] Filed: Aug. 12, 1987

[51] Int. Cl.[4] .............................................. B25J 15/08
[52] U.S. Cl. .................... 294/119.1; 901/36; 901/39
[58] Field of Search ............. 294/86.4, 88, 94, 116, 294/119.1; 269/229, 233; 279/66, 71, 110, 114; 901/31, 36–39

[56] References Cited

U.S. PATENT DOCUMENTS

| 271,941 | 2/1883 | Sleeth et al. | 279/71 |
| 435,475 | 9/1890 | Abrams | 279/114 |
| 1,442,107 | 1/1923 | Vernaz | 279/114 |
| 2,690,915 | 10/1954 | Pealer | 279/114 |
| 4,469,362 | 9/1984 | Schaarschmidt | 294/116 |
| 4,529,237 | 7/1985 | Gupta et al. | 294/86.4 |

FOREIGN PATENT DOCUMENTS

| 18165 | 2/1978 | Japan | 294/119.1 |
| 742342 | 6/1980 | U.S.S.R. | 294/86.4 |

Primary Examiner—Johnny D. Cherry
Attorney, Agent, or Firm—Ernest E. Helms

[57] ABSTRACT

The present invention provides an apparatus and method of utilization of the same of a linear motion gripper usable in conjunction with a robot or like structure. The gripper is powered by a rotary actuator connected with a plate which is cammingly engaged with a slider or sliders. Movement of the actuator causes the slider to move linearly. However, loss of power of the actuator cammingly locks the slider(s) in position. Therefore, upon loss of power to the actuator, the slider(s) are locked in position.

1 Claim, 1 Drawing Sheet

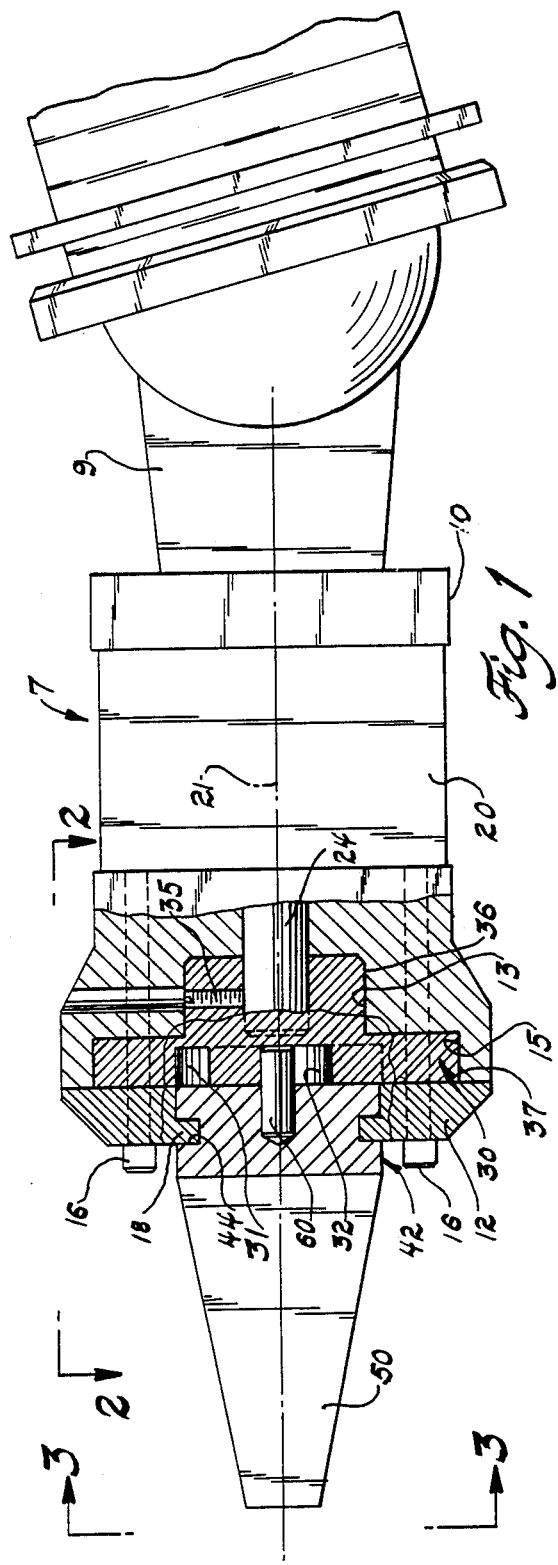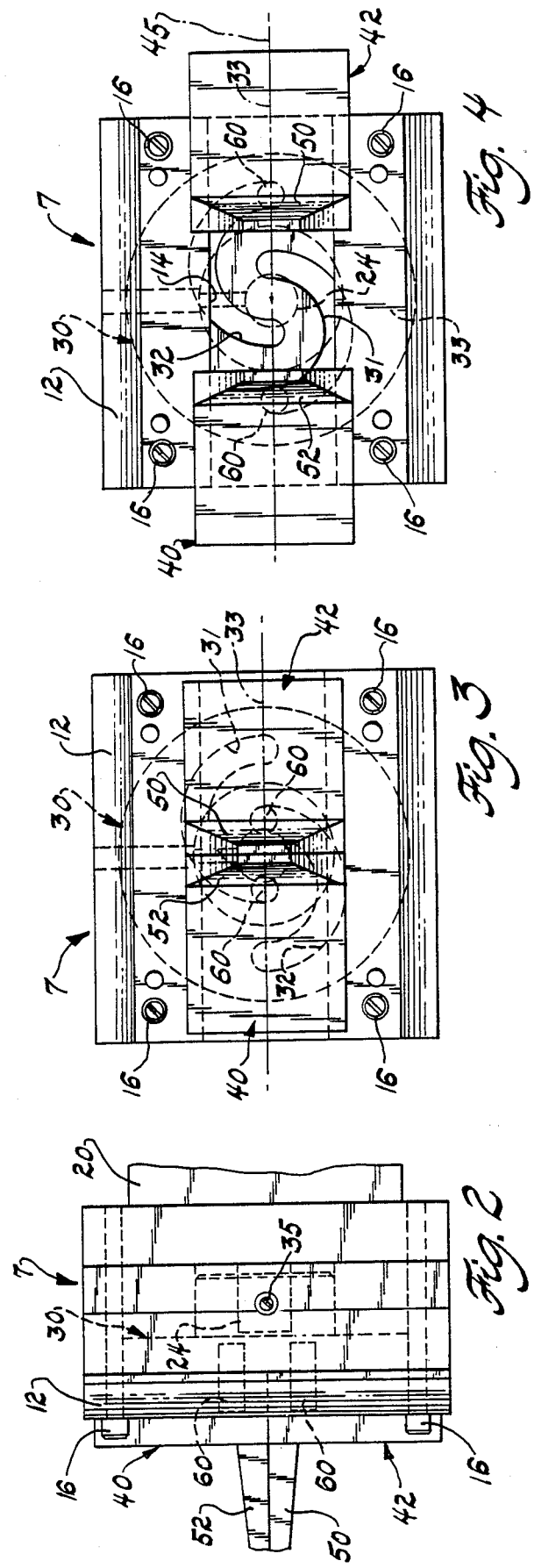

4,762,357

LINEAR ACTION GRIPPER FOR A ROBOT

FIELD OF THE INVENTION

The field of the present invention is that of grippers for robots or like structures.

DISCLOSURE STATEMENT

Prior to the present invention most linear motion grippers had a frame and slidably mounted thereto opposing sliders with attached fingers. To have the fingers converge to pick up a workpiece one or both of the sliders are connected with a fluid activated cylinder to move the fingers in relationship to one another. Most of the cylinders are pneumatically activated. Upon failure of the air system due to the shut down of the air supply or inadvertent rupture of the pneumatic lines, the gripper fingers are free to slide linearly. Therefore, the gripper can possibly lose its grasp on a heavier object when there is a failure in the air system. It is desirable to provide a gripper whereupon the occurence of a failure of the power supply to the actuator will cause the gripper sliders (or fingers) to be locked in position.

SUMMARY OF THE INVENTION

To meet the above noted and other desires the present invention is brought forth. The present invention provides a linear action gripper for a robot or like having a selectively activated power rotary actuator connected with a plate. The gripper has at least one slider mounted to a frame for linear motion at an angle with the axis of rotation of the actuator. The slider is cammingly engaged with the plate. Rotation of the plate by the actuator causes the slider to move in a linear fashion. Upon failure of power to the actuator, the slider is cammingly locked into its present position. Therefore the grasp of the gripper is retained.

It is an object of the present invention to provide an apparatus and method of utilization of a linear action gripper wherein failure of the power to the actuator of the gripper causes the gripper to be locked in position.

It is an object of the present invention to provide a linear action gripper for a robot or the like, the gripper including a frame, a selectively activated power rotary actuator connected with the frame including a plate rotatable along a first axis, and at least one slider mounted to the frame for linear movement at an angle with the first axis and cammingly engaged with the plate whereby the slider is movable in response to rotation of the plate when the actuator is activated and the slider is cammingly locked in position when the actuator is not activated.

It is an object of the present invention to provide a linear action gripper for a robot or the like, the gripper including a frame, a selectively activated power rotary actuator connected with said frame, a circular plate connected with the actuator rotatable in a first axis having two semicircular slots, the slots ending on a common diameter of said plate, and two sliders mounted to the frame for linear movement perpendicular with the first axis, each said slider being cammingly engaged with one of said semicircular slots of said plate whereby the sliders are movable in opposite directions in response to rotation of the plate when the actuator is activated and each of said sliders is cammingly locked in position when the actuator is not activated.

It is an object of the present invention to provide a method of using a gripper connected to a robot or a like, said method including connecting a gripper frame to a robot or like, connecting with said frame a rotary actuator including a plate rotatable along a first axis, slidably mounting to the frame at least one slider capable of linear movement at an angle with the axis of rotation of the rotary actuator, and cammingly engaging with said plate the slider whereby the slider is movable in response to rotation of the plate when the actuator is activated and the slider is cammingly locked in position when the actuator is not activated.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a preferred embodiment front sectional view of a gripper of the present invention;

FIGS. 2 and 3 are a view along lines 2—2 and 3—3 respectively of FIG. 1; and

FIG. 4 is a view similar to FIG. 3 except that the sliders are spread apart.

DETAILED DESCRIPTION OF THE DRAWINGS

Referring to FIGS. 1, 2 and 3 the linear action gripper has a frame 10 which can be coaxially attached to a robot 9 or like structure typically at the top of the frame 10. Connected with the frame is a selectively activated reversible rotary actuator 20. The rotary actuator 20 can be electrically or hydraulically activated, or can be a standard pneumatically powered actuator. The actuator if pneumatic will have inlet and outlet connections (not shown). The rotary actuator has a first rotational axis 21 which is typically generally parallel with the frame 10. The frame 10 is made with a small diameter circular indention 13 and a large diameter indention 15. The frame also has a lower portion 12, connected by threaded fasteners such as bolts 16, providing a linear track mounting for the sliders 40, 42.

Fixably connected to an actuator rod 24 by a retainer screw 35 is a circular plate 30. The plate 30 rotates in a plane in the embodiment illustrated perpendicular to the axis of the rotation of the actuator. The plate 30 has a smaller diameter 36 mounted within the circular indention 13 and a larger diameter 37 mounted within circular indention 15.

The plate has two slots 31, 32 in constant radius semicircular paths ending along a common diameter 33 of the plate 30. A line 45 drawn intersecting the ends of slots 31 and 32 is parallel or analogous with the direction of travel of sliders 40 and 42 when the sliders 40, 42 are in an extreme inner (FIG. 3) or outer (FIG. 4) position. The inner most intersections of slots 31 and 32 with line 45 are distanced from one another a length equal to the radius of the paths.

The gripper will have at least one and typically two movable sliders 40 and 42. As illustrated the sliders 40 and 42 have integrally joined fingers 50 and 52 respectively. In the alternative the sliders 40 and 42 have predrilled threaded apertures allowing for connection of a desired custom formed finger.

The sliders will be slidably mounted and mated and captured in frame lower portion 12 by a tongue 18 in groove 44 type connection. Each of the sliders 40, 42 has a pin 60 which is cammingly engaged into one of the slots 31, 32 of the plate 30. It is usually preferable that the center lines of the sliders 40 and 42 be along a line common with the diameter of the plate 30. As shown the sliders are geometrically spaced with respect to the actuator 20 and will grip and center an object with respect to the first axis 21.

In operation, when the plate 30 is rotated by the actuator 20 in a counterclockwise manner (from the position shown in FIG. 3), the slider pins 60 cammingly engage with the slots 31 and 32 and the sliders 40 and 42 will move in opposite directions away from each other. Upon activation of the actuator 20 to rotate in a clockwise direction (from the position shown in FIG. 4), the sliders 40 and 42 will move in opposite directions towards one another. Upon cessation of operation of the actuator 20 selectively or due to inadvertent power failure, the camming engagement of the slider pins 60 with the plate slots 31 and 32 will lock the sliders 40 and 42 in position. Therefore, the gripper will maintain its grasp on a workpiece. Due to the cam angle of the slots 31, 32 with the pins 60 it is relatively difficult to move the sliders 40, 42.

Another advantage of the present invention is that with the plate slots 31 and 32 there is no need for stops to prevent the sliders 40, 42 from being pushed out from the frame lower portion 12. Counterclockwise rotation of plate 30 past the position of FIG. 4 will be prevented due to the contact of the pins 60 with the ends of slots 31 and 32. In like manner contact between sliders 40 and 42 or contact between pins 60 with the ends of slots 31 and 32 will prevent further inward movement of sliders 40 and 42 toward one another when plate 30 is rotated clockwise from the position shown in FIG. 3. It is apparent to those skilled in the art that the slots 31 and 32 can be designed to provide a linear motion at a function to angular velocity of the rotary actuator rod 24 as desired.

The present invention provides a method of using a gripper 7 connected to a robot 9 or a like including the following steps:

1. Connecting a gripper frame 10 to a robot 9 or like;
2. Connecting with the frame a rotary actuator 20 including a plate 30 rotatable along a first axis 21;
3. Slidably mounting to the frame 10 at least one slider 40 capable of linear movement at an angle with the axis 21 of rotation of the rotary actuator 20; and
4. Cammingly engaging 60, 31 with the plate 30 the slider 40 whereby the slider 40 is movable in response to rotation of the plate 30 when the actuator 20 is activated and the slider 40 is cammingly locked in position when the actuator 20 is not activated.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A linear action gripper for a robot or the like, said gripper in combination comprising:
    a frame, said frame having a top portion for coaxial connection with said robot or the like, and said frame having a first small diameter indention and a second larger diameter indention and said frame having a threaded fastener connected lower portion, said lower portion forming a linear track with tongues;
    a selectively activated power rotary actuator connected with said frame and rotatable along a first axis;
    a circular plate perpendicularly connected with said actuator having a small diameter portion mounted within said first frame indention and a second larger diameter mounted within said second larger indention, said circular plate being rotatable in said first axis, said circular plate having two common diameter constant radius semicircular slots, said slots ending on a common diameter of said plate and wherein the distance between the inner most intersections of said semicircular slots with said common diameter is equal to the radius of said slots; and
    two sliders mounted to said lower portion, said sliders having grooves mated with and captured by said tongues for linear movement perpendicular with said first axis, said sliders being geometrically spaced with respect to said actuator for gripping and centering an object along said first axis, each said slider having a pin cammingly engaged with one of said semicircular slots of said plate whereby said sliders are movable in opposite directions in response to rotation of said plate when said actuator is activated and each of said sliders is cammingly locked in position when said actuator is not activated.

* * * * *